United States Patent
Prakah-Asante et al.

(10) Patent No.: US 9,630,627 B2
(45) Date of Patent: Apr. 25, 2017

(54) METHOD AND APPARATUS FOR ADAPTIVE DRIVE CONTROL INCLUDING FUEL-ECONOMIC MODE ENGAGEMENT

(71) Applicant: FORD GLOBAL TECHNOLOGIES, LLC, Dearborn, MI (US)

(72) Inventors: Kwaku O. Prakah-Asante, Commerce Township, MI (US); Steven Joseph Szwabowski, Northville, MI (US); Fling Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/850,584

(22) Filed: Sep. 10, 2015

(65) Prior Publication Data

US 2017/0072958 A1  Mar. 16, 2017

(51) Int. Cl.
| | |
|---|---|
| *B60W 30/182* | (2012.01) |
| *B60W 10/06* | (2006.01) |
| *B60W 10/10* | (2012.01) |
| *B60W 10/20* | (2006.01) |
| *B60W 10/22* | (2006.01) |
| *B60W 40/09* | (2012.01) |

(52) U.S. Cl.
CPC .......... *B60W 30/182* (2013.01); *B60W 10/06* (2013.01); *B60W 10/10* (2013.01); *B60W 10/20* (2013.01); *B60W 10/22* (2013.01); *B60W 40/09* (2013.01); *B60W 2400/00* (2013.01); *B60W 2540/30* (2013.01); *B60W 2550/30* (2013.01); *B60W 2900/00* (2013.01)

(58) Field of Classification Search
CPC .... B60W 30/182; B60W 10/06; B60W 10/10; B60W 10/20; B60W 10/22; B60W 40/09; B60W 2400/00; B60W 2540/30; B60W 2550/30; B60W 2900/00
USPC .......................................................... 701/36
See application file for complete search history.

(56) References Cited

U.S. PATENT DOCUMENTS

| | | | |
|---|---|---|---|
| 8,600,614 B2 | 12/2013 | Filev et al. | |
| 8,688,321 B2 | 4/2014 | Prakah-Asante et al. | |
| 8,738,228 B2 | 5/2014 | Filev et al. | |
| 8,977,479 B2 | 3/2015 | Yang et al. | |
| 2009/0143934 A1 | 6/2009 | Motonaga et al. | |
| 2010/0036574 A1* | 2/2010 | Hopp | B60W 10/026 701/68 |
| 2011/0015037 A1* | 1/2011 | Koenig | B60W 10/115 477/121 |
| 2012/0196723 A1* | 8/2012 | Christen | B60W 30/18018 477/167 |
| 2013/0005530 A1* | 1/2013 | Fujikawa | B60W 10/06 477/5 |
| 2013/0103238 A1* | 4/2013 | Yu | G06F 17/00 701/22 |

(Continued)

*Primary Examiner* — Mcdieunel Marc
*Assistant Examiner* — James E Stroud
(74) *Attorney, Agent, or Firm* — Jennifer Stec; Brooks Kushman P.C.

(57) ABSTRACT

A system includes a processor configured to receive environmental context data upon which automatic engagement of a fuel economic driving mode (eco-mode) is conditioned. The processor is also configured to evaluate the context data to determine if the eco-mode should be automatically engaged based on a data correspondence to an engagement factor and engage the eco-mode upon correspondence of the data to an engagement factor.

4 Claims, 4 Drawing Sheets

(56) References Cited

U.S. PATENT DOCUMENTS

2014/0025259 A1 1/2014 Szwabowski et al.
2014/0236385 A1 8/2014 Filev et al.
2015/0066319 A1 3/2015 Jeon et al.
2015/0112577 A1 4/2015 Velusamy et al.

* cited by examiner

METHOD AND APPARATUS FOR ADAPTIVE DRIVE CONTROL INCLUDING FUEL-ECONOMIC MODE ENGAGEMENT

TECHNICAL FIELD

The illustrative embodiments generally relate to a method and apparatus for adaptive drive control including fuel-economic mode engagement.

BACKGROUND

Adaptive vehicular systems have the ability to change a state of one or multiple sub-systems based on changing conditions around the vehicle. For example, adaptive cruise control can slow a vehicle if it approaches another vehicle too closely. In another example, adaptive drive control may vary a traction control setting or other vehicle mode (e.g., sport, normal, comfort) based on changing road conditions. Further application of adaptive features to other vehicle settings could also produce desirable results, more in line with driver preferences and which improve the driving experience.

In one existing example related to fuel economy, an eco-drive support device notifies a driver of the eco-friendliness of a vehicle driving operation being performed by the driver. The device includes: an operating unit that calculates eco-drive support information that indicates the eco-friendliness of the vehicle driving operation being performed by the driver; and a notification control unit that controls a notifying unit to notify the driver of the eco-drive support information, if there is a request from an input unit for notification of the eco-drive support information. In this device, the notification control unit controls the notifying unit to notify the driver of the eco-drive support information though there is not a request from the input unit for notification of the eco-drive support information, if a predetermined condition for providing the eco-drive support information is satisfied.

SUMMARY

In a first illustrative embodiment, a system includes a processor configured to receive environmental context data upon which automatic engagement of a fuel economic driving mode (eco-mode) is conditioned. The processor is also configured to evaluate the context data to determine if the eco-mode should be automatically engaged based on a data correspondence to an engagement factor and engage the eco-mode upon correspondence of the data to an engagement factor.

In a second illustrative embodiment, a system includes a processor configured to engage a fuel-economic driving mode (eco-mode) based on evaluation of received traffic and vehicle-location data, in conjunction with a determined driver aggressiveness level, to determine if there is a correspondence between the traffic and vehicle-location data, the aggressiveness level and a predefined eco-mode engagement threshold. The processor is also configured to register disengagement of the eco-mode and, until the eco-mode is reengaged, decay likelihood of eco-mode engagement previously stored with respect to a present vehicle location.

In a third illustrative embodiment, a computer-implemented method includes determining a present traffic level and automatically engaging a fuel-economic driving mode (eco-mode) if the present traffic level is above a predefined threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
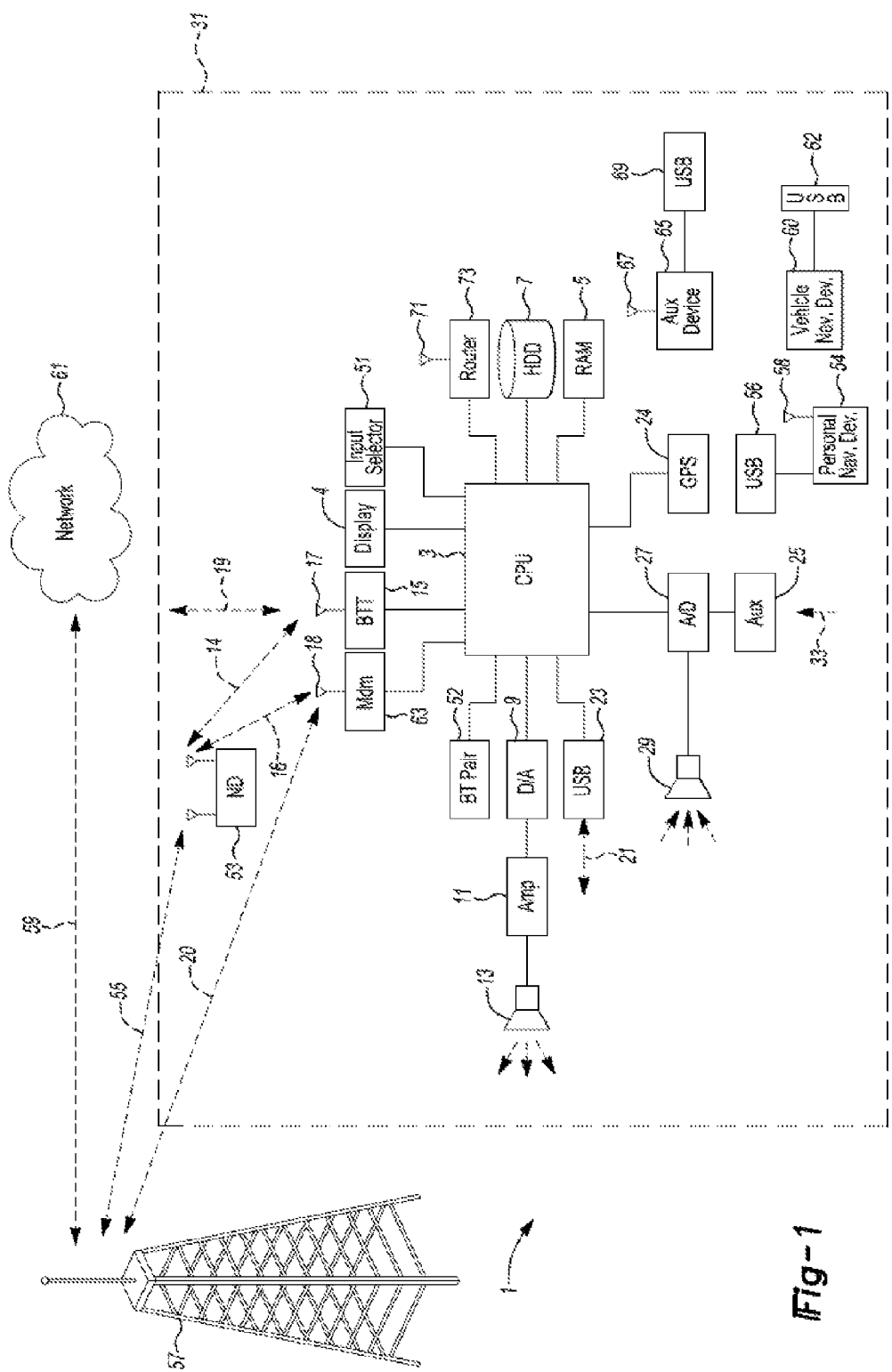
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Adaptive Drive Control (ADC) can automatically place the vehicle in augmented settings for driver convenience and personalized driving experiences. The ADC has been developed such that sport, normal and comfort modes may be automatically selected to adapt to meet road conditions, curve negotiation and undulating curves. An example of this is described in corresponding and commonly owned U.S. Pat. No. 8,600,614, the contents of which are hereby incorporated by reference.

The potential exists, however, to select additional modes based on additional considerations, such as, for example, selecting a mode which provides enhanced fuel economy (but which may also limit certain factors, such as acceleration and speed).

The illustrative embodiments present a new system and method for Augmented Adaptive Drive Control (A-ADC). In addition to the ADC decision-making automatically selecting Sport, Normal and Comfort modes (or other, similar ADC systems) to adapt to meet road conditions, curve negotiation and undulating curves, an Eco-Mode could be conditionally automatically selected during a drive. The A-ADC may automatically select the Eco-Mode based on factors including, but not limited to, traffic conditions, a location, and a driver profile.

Components of an illustrative example of the system can include, but are not limited to, augmented ADC decision-making, location assessment, traffic condition assessment, driver activity, and a driver interface. The system may automatically provide Eco-Mode selection blended with Sport, Normal, Comfort and other mode selection for enhanced convenience and an efficient ride. Generally, selection of sport (performance), normal or comfort modes can affect systems such as, but not limited to, the powertrain 215, the Continuously Controlled Damping (CCD) 217, and the Electronic Power Assisted Steering (EPAS) 219.

For example, in one non-limiting situation, when stop-and-go traffic is observed the vehicle may be automatically switched into Eco-Mode to conserve energy. In another non-limiting example, the system may select eco-mode for efficiency when driving in locations obtained from maps/GPS where quite calm driving is required or desired (such as around schools and residential areas).

Figure 2:
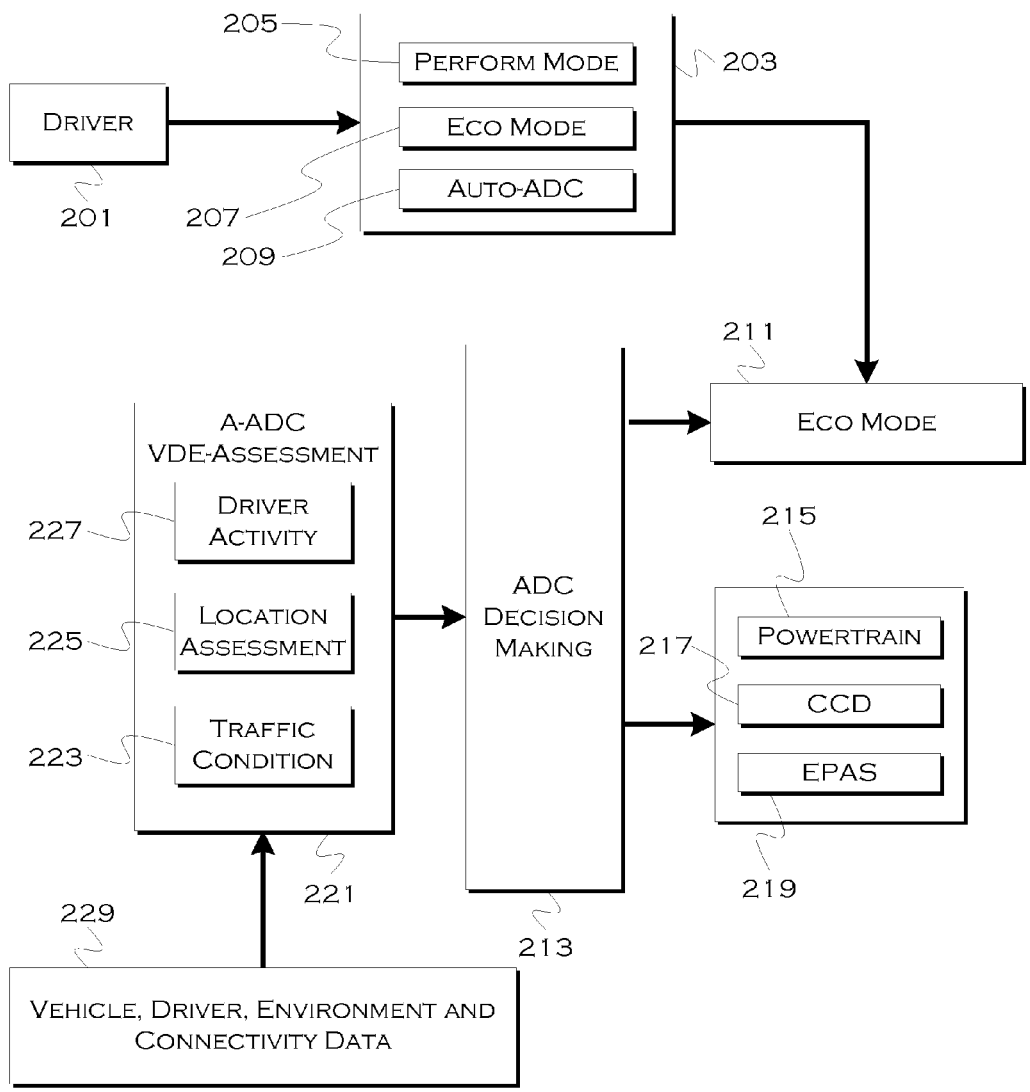
FIG. 2 shows an illustrative system diagram for an adaptive drive control with fuel economy considerations.

FIG. 2 shows an illustrative system diagram for an adaptive drive control with fuel economy considerations. The system includes exemplary sub-systems for Location Assessment 225, Traffic Condition Assessment 223, and Augmented ADC Decision-Making 221. Thresholds for engagement under various conditions can be pre-defined and/or adapted based on observed driver preferences over time.

In addition to the ADC decision-making (ADC-DM) 213 potentially automatically selecting Sport, Normal and Comfort modes (collectively performance modes 205) to adapt to meet road conditions, curve negotiation and undulating curves, the eco-mode 207 could be conditionally automatically selected. The ADC-DM 213 selects the eco-mode, for example, based on traffic conditions, a location, or driving state (or driver profile) 227.

For example, an illustrative basis for ADC Eco-Mode selection is given by:

$$ADC_{EcoMode} = \begin{cases} 1 \text{ if} \begin{cases} \text{traffic\_state} > \alpha \\ \text{location\_state} = 1 \\ \text{driver}_{activity} < \beta \text{ and traffic\_state} < \alpha \end{cases} \\ 0 \text{ otherwise} \end{cases}$$

The traffic condition may be based on analysis of the driver engagement with the brake and pedal for stop and go traffic, and the environment conditions for vehicles equipped with radar, vision and environmental sensors 229. Additional traffic information may be obtained from over-the-air broadcasted connected systems. The traffic state may be provided to the ADC-DM as a value with a range from 0-1, with values closer to 1 reflecting high traffic conditions (stop-go), and values closer to 0, representing lower traffic conditions. When stop-and-go traffic is observed the vehicle may be automatically put in eco-mode 211 to conserve energy. Various threshold levels of traffic for mode engagement can be defined for different driver aggressiveness levels and/or based on observed driver preferences stored over time. Locations from maps/GPS where cautious driving is required/desired around schools and residential areas may also elicit the ADC-DM Eco-mode selection.

The driver activity characterization may determine a cautious or aggressive driving style for the driver. When cautious driving style is deduced and the light traffic state is observed, Eco-Mode may be engaged. The table below shows an example decision table for the ADC-DM Eco-Mode selection. The ADC-DM may provide conditional decision-making to determine the Eco state in conjunction with the Normal, Performance, and Comfort mode for an enhanced driver convenience and efficient performance. A threshold level of cautious driving for a given area may be predefined, and when sufficient cautious driving for a location has been observed, eco-mode engagement may occur. This level of cautious driving may be augmented based on observed behavior over time, so it may rise and fall above and below the threshold for engagement. Thresholds to determine whether or not driving is "aggressive" may also be predefined.

| Traffic Condition | Driver Activity | Location_ID | ADC_Eco (binary engagement indicia) |
|---|---|---|---|
| >α | All values (0-1) | 0 or 1 | 1 |
| <α | <β | 0 or 1 | 1 |
| — | — | 1 | 1 |
| — | >β | 0 | 0 |

Driver activity (e.g., with the pedal and steering wheel) may be characterized to determine a driver style to contribute for the engagement of the ADC-Eco mode. Commonly owned U.S. Pat. No. 8,738,228, the contents of which are hereby incorporated by reference, discloses exemplary approaches for determining driver style activity as input to the ADC decision-making system.

Locations from maps/GPS where cautious driving is required around schools and residential areas can correspond to an Eco-mode engagement. Regions where aggressive and cautious driving behavior has been experienced may also be learned. If significant cautious driving behavior over time in a zone location (i) is identified, the GPS coordinates of that location is stored and an initial likelihood (p) of desirable eco-mode based on cautious driving behavior is given:

$$L_i(GPS_{lat}, GPS_{long}) = p \quad i=1, \ldots, n$$

During each trip, if the vehicle drives through a cluster of GPS coordinates corresponding to $L_i$ driving behavior can be evaluated to positively or negatively augment the likelihood of cautious driving for those coordinates:

If cautious_driving (corresponding to some predefined condition(s)):

$$L_i(GPS_{lat}, GPS_{long}) = p + \epsilon i = 1, \ldots, n$$

Else:

$$L_i(GPS_{lat}, GPS_{long}) = p - \epsilon i = 1, \ldots, n$$

Where ($\epsilon$) represents some augmentation factor. This can result in the creation of driver-defined (based on behavior) cautious driving zones which can trigger the engagement of eco-mode.

Traffic condition evaluation can be based on, for example, analysis of driver engagement with the brake and pedal for stop-and-go traffic. Vehicles equipped with radar would also benefit from traffic density estimation from estimation of the density. Issued, commonly owned U.S. Pat. Nos. 8,977,479 and 8,688,321, the contents of both of which are hereby incorporated by reference, provide methods for traffic-type decision making.

An A-ADC Driver Interface sub-system 203 may provide a system for determining the driver 201 automatic 209 or manual (205, 207) selection. The driver may select, for example, the Auto-ADC 209 and the system will automatically adapt to mode selection for particular driving contexts. In a non-limiting example, the A-ADC would automatically select Sport, Normal and Comfort modes to adapt to meet road conditions, curve negotiation and undulating curves. The eco-mode would be conditionally selected based on the traffic condition, the location, or driving as described above.

Figure 3:
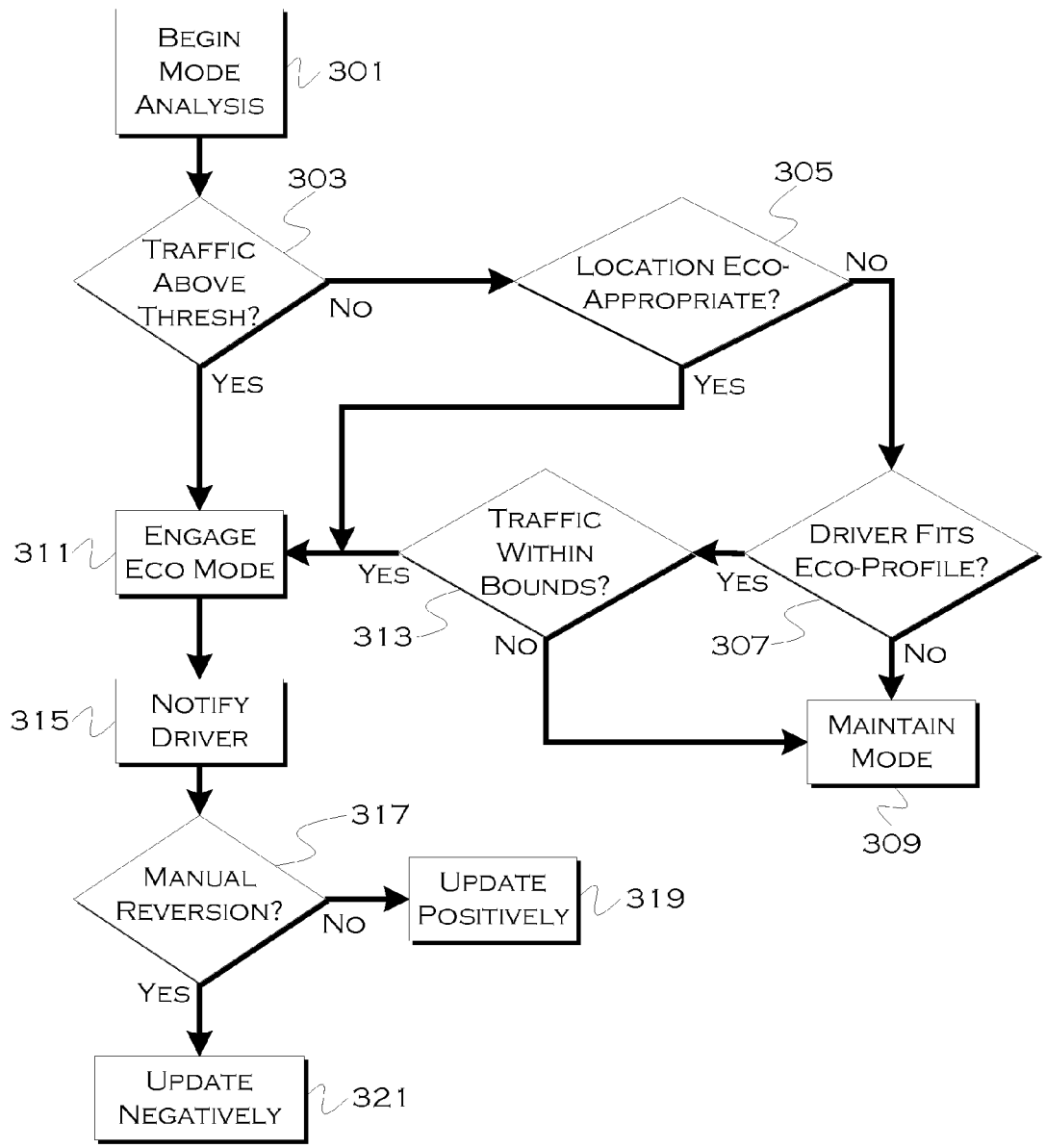
FIG. 3 shows an illustrative process for eco-driving engagement analysis.

FIG. 3 shows an illustrative process for eco-driving engagement analysis. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process analyzes the current driving conditions, locations, driving style, etc. to determine if implementation of an eco-mode is appropriate. At some point, the process begins mode analysis 301. This could be ongoing, based on a predetermine change in location (or a location correspondence), based on a driving behavior change, etc.

In this example, the process first determines if traffic is above a predetermined threshold 303. Since, in this example (where automatic mode selection is engaged), the process always engages eco-mode when traffic is above a certain threshold (e.g., without limitation, at a stop-and-go level), the process need consider nothing else, and eco-mode is engaged 311. In other examples, other factors may also or alternatively be considered. It is also considered that a low-fuel/power state may automatically trigger eco-mode selection if a driver has less than a threshold likelihood of reaching a specified destination and/or a refueling/recharging point.

If the traffic is not above the threshold defining eco-mode engagement, the process then checks to see if the present vehicle location corresponds to an appropriate location for eco-mode engagement 305. This can include, but is not limited to, school zones, neighborhoods, construction zones and other locations with speed limits below a certain threshold and/or any locations where cautious driving has been previously observed (possibly above a threshold). Finally, if the location and traffic level don't dictate eco-mode engagement, the process determines if a driver profile (the general driver behavior, e.g., cautious or aggressive) is suitable for eco-mode engagement 307. Also, the process determines if a current traffic level corresponds to a desirable level for eco-mode engagement in light of the driver profile 313.

For example, medium or light traffic might define eco-mode engagement for one driver (cautious), medium traffic for another driver (semi-cautious) and no traffic might avoid automatic eco-mode engagement for all drivers (wherein a current mode persists 309). Heavy traffic automatically causes eco-mode engagement for all drivers in this example. Various traffic/driver profile combinations can be used to evaluate the appropriateness (and subsequent engagement) of eco-mode as desired.

Once eco-mode has been engaged, the process may notify the driver 315 in case certain vehicle characteristics are limited in this mode (e.g., without limitation, acceleration, top speed, etc.). If the driver manually reverts to regular mode 317, this may be an indication that the basis for eco-mode was not a "good reason" to engage eco-mode for that driver. The basis can be negatively reinforced (e.g., decayed) 321 in such instances. If the driver permits the eco-mode to persist, any basis (assuming the basis represents a tractable feature) can be positively reinforced 319.

Through tracking location, driving behavior, traffic levels and other appropriate conditions, fuel/power can be preserved when appropriate to enhance the driving experience. Based on driver response to eco-mode engagement (or manual driver engagement), the variables (location, traffic, behavior) and decisions with respect to those variables can be tracked and adjusted to tailor selection to particular driver preferences.

Figure 4:
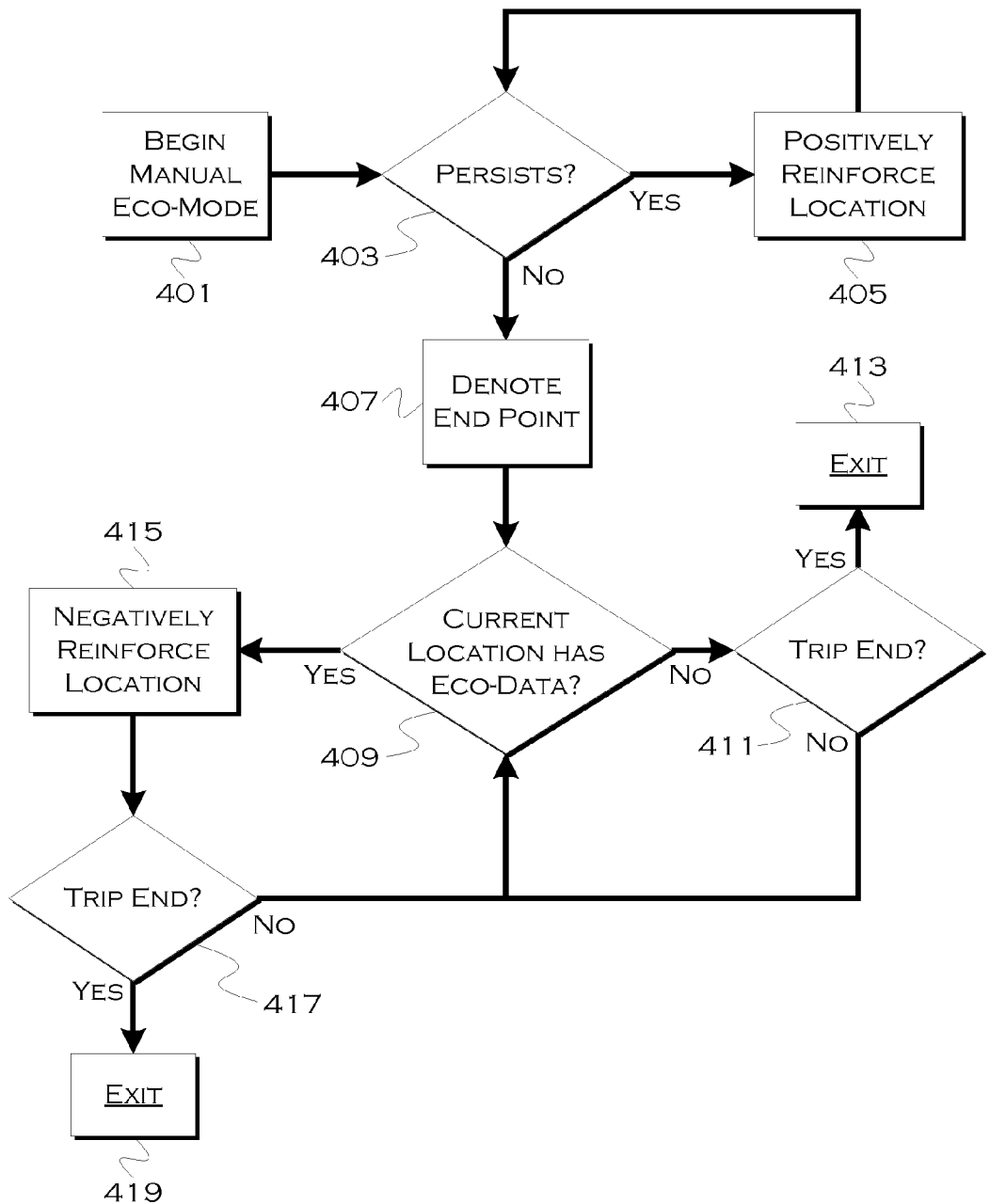
FIG. 4 shows an illustrative process for eco-driving mode utilization tracking.

FIG. 4 shows an illustrative process for eco-driving mode utilization tracking. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process detects manual initiation of an eco-mode setting 401. As long as the eco-mode persists 403, the process will update periodic GPS locations 405 with a positive reinforcement of eco-mode for those locations (and/or locations can be initiated if not previously tracked).

Once eco-mode is terminated by the driver 403, the process will denote an endpoint for the eco-mode 407 and then will determine, for the rest of a journey while eco-mode is not re-engaged, whether a current location, or defined location that a vehicle reaches, has eco-mode data associated therewith. If not, the process continues to repeat this check until a trip ends 411 (or until an eco-mode is re-engaged manually, restarting the process). If the data had eco-mode data previously associated therewith, the process may decay a likelihood of engagement 415, since the driver has manually disabled the eco-mode at this time. Again, this can persist until a trip ends 417.

It is possible to track driving behavior in the same manner as eco-mode manual engagement tracking as above, positively reinforcing eco-mode engagement for areas where cautious behavior is observed, and negatively decaying eco-mode engagement for areas where aggressive behavior is observed.

While representative embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive environmental context data, including vehicle location data, upon which automatic engagement of a fuel economic driving mode (eco-mode) is conditioned;
evaluate the context data to determine if the eco-mode should be automatically engaged based on the vehicle location data indicating a predefined proximity to a predefined residential area; and
engage the eco-mode upon the vehicle being within the predefined proximity to the predefined residential area.

2. A system comprising:
a processor configured to:
engage a fuel-economic driving mode (eco-mode) based on evaluation of received vehicle-location data to determine if the vehicle-location data indicates that a vehicle is within a predefined proximity to a predefined residential area or predefined school zone;
register eco-mode disengagement; and
as the vehicle travels, until the eco-mode is reengaged, decay any variables defining likelihoods of eco-mode engagement previously stored with respect to any vehicle locations.

3. The system of claim 2, wherein the processor is configured to increment the variables defining likelihood of eco-mode engagement previously stored with respect to the vehicle locations until the processor registers eco-mode disengagement.

4. A computer-implemented method comprising:
determining, via a vehicle computer, if a vehicle location is within a predefined proximity to a predefined residential area or school zone; and
automatically engaging the eco-mode if the vehicle location is within the predefined proximity to the predefined residential area or school zone.

* * * * *